US 6,648,005 B2

(12) United States Patent
van der Blom

(10) Patent No.: US 6,648,005 B2
(45) Date of Patent: Nov. 18, 2003

(54) ACTIVATION PIN

(75) Inventor: Nicolaas van der Blom, Birkerod (DK)

(73) Assignee: NVB International, Birkerod (DK)

( * ) Notice: Subject to any disclaimer, the term of this patent is extended or adjusted under 35 U.S.C. 154(b) by 70 days.

(21) Appl. No.: 10/021,796

(22) Filed: Oct. 30, 2001

(65) Prior Publication Data

US 2002/0074039 A1 Jun. 20, 2002

Related U.S. Application Data

(62) Division of application No. 09/180,689, filed as application No. PCT/DK97/00223 on May 14, 1997, now Pat. No. 6,378,547.

(51) Int. Cl.⁷ ............................................. F16K 15/20
(52) U.S. Cl. .................. 137/224; 137/223; 137/614.2; 251/149.8
(58) Field of Search ................ 137/223, 224, 137/231, 614.2, 614.21; 251/149.8

(56) References Cited

U.S. PATENT DOCUMENTS

| | | |
|---|---|---|
| 1,492,838 A | 5/1924 | Dilweg |
| 1,850,111 A | 3/1932 | Kelsey |
| 2,025,067 A | 12/1935 | Miller |
| 2,257,498 A | 9/1941 | Hansen |
| 2,489,397 A * | 11/1949 | Brummer .................... 137/224 |
| 2,685,906 A | 8/1954 | Williams |
| 2,716,998 A | 9/1955 | Knasko |
| 2,976,906 A | 3/1961 | Kamm et al. |
| 3,249,144 A | 5/1966 | Dobrikin |
| 3,926,205 A | 12/1975 | Gourlet |
| 4,088,147 A | 5/1978 | Krechel et al. |
| 4,165,760 A | 8/1979 | Guenther |
| 4,489,855 A | 12/1984 | Boetger |
| 4,611,828 A | 9/1986 | Brunet |
| 4,662,412 A | 5/1987 | Swallert |
| 4,712,812 A | 12/1987 | Weir, III |
| 4,932,451 A | 6/1990 | Williams et al. |
| 4,932,849 A | 6/1990 | Scheffer |
| 4,938,272 A | 7/1990 | Sandy, Jr. et al. |
| 5,012,954 A | 5/1991 | Will |
| 5,094,263 A * | 3/1992 | Hurrell et al. ............... 137/224 |
| 5,762,095 A * | 6/1998 | Gapinski et al. ............. 137/223 |
| 5,778,923 A * | 7/1998 | Marston ...................... 137/226 |
| 5,785,076 A * | 7/1998 | You ............................. 137/231 |
| 5,819,781 A * | 10/1998 | Wu ............................. 137/231 |

FOREIGN PATENT DOCUMENTS

| | | | |
|---|---|---|---|
| DE | 25 44 555 | * 7/1977 | .................. 137/224 |
| DE | 38 19 771 C2 | 7/1989 | |
| DE | 196 01 952 A1 | 7/1997 | |
| FR | 2 653 523 | 4/1991 | |
| GB | 231992 | 4/1925 | |
| GB | 872246 | 7/1961 | |
| GB | 977139 | 12/1964 | |
| GB | 1599304 | 9/1981 | |
| WO | WO/84/02968 | 8/1984 | |
| WO | WO/92/22448 | 12/1992 | |
| WO | WO/97/43570 | 11/1997 | |

\* cited by examiner

Primary Examiner—John Rivell
(74) Attorney, Agent, or Firm—Harness, Dickey & Pierce, P.L.C.

(57) ABSTRACT

An activating pin which comprises a valve part, the piston part comprises within it a channel, the cross-section of said channel is, at least one part of said piston part, consisting of sectors, wherein in each sector the distance between the center point of the channel cross-section and the outermost limiting surface of the channel is larger than the corresponding distance measured along the line separating the sector from an adjacent sector, and said valve part is positioned movably with respect to said piston part between a first valve position and a second valve position for enabling the conduction of gaseous and/or liquid media through said channel when said valve part is in said first valve position, and inhibiting the conduction of gaseous and/or liquid media through said channel when said valve part is in said second valve position.

12 Claims, 11 Drawing Sheets

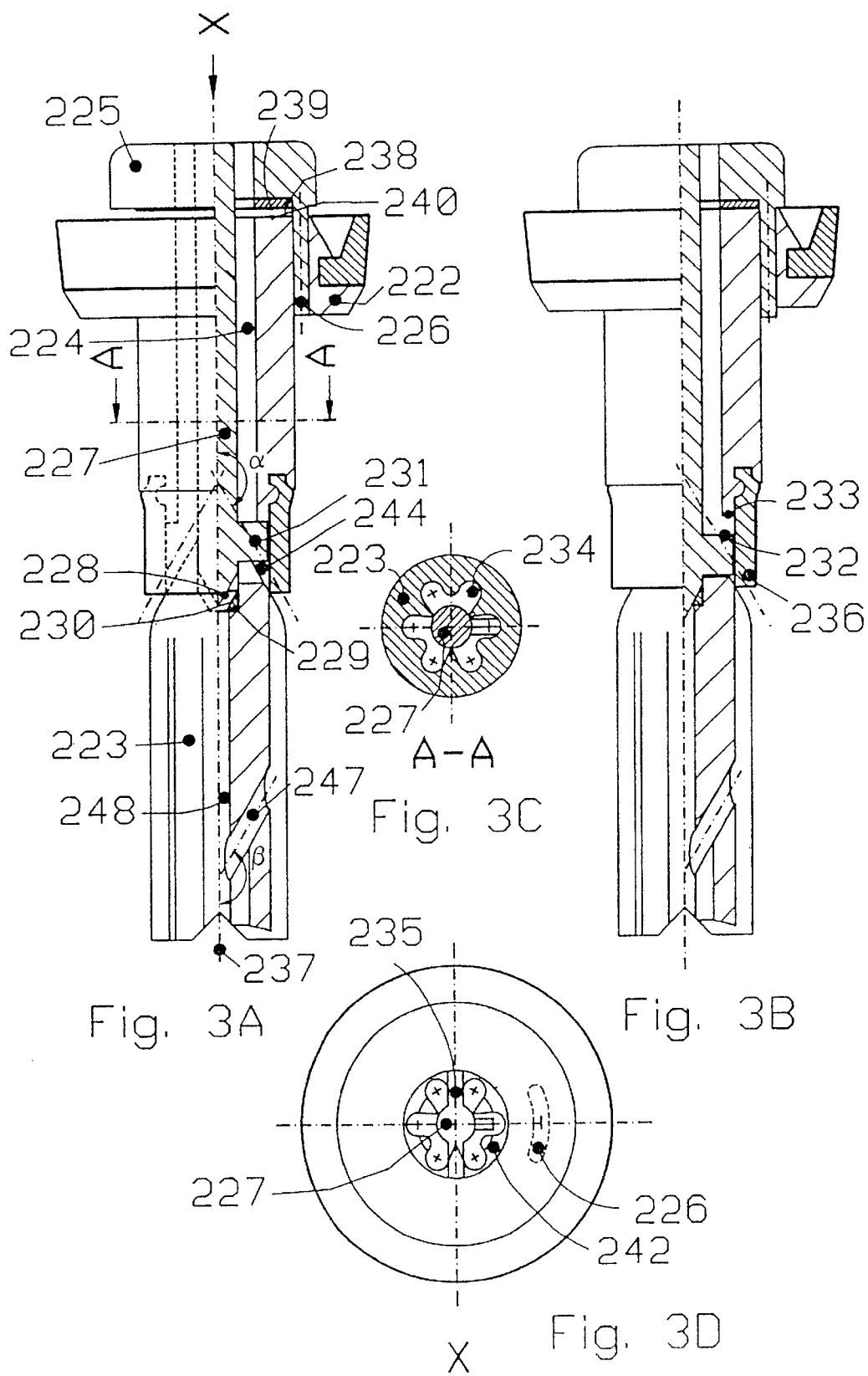

E-E

F-F

ACTIVATION PIN

This is a divisional patent application based on U.S. patent application Ser. No. 09/180,689, now U.S. Pat. No. 6,378,547, filed on Nov. 13, 1998 as a Section 371 national application based on PCT/DK97/00223, filed May 14, 1997. U.S. patent application Ser. No. 09/180,689 is incorporated herein by reference.

TECHNICAL FIELD

The invention concerns an activating pin for a valve connector for connecting to inflation valves, the connector comprising a housing to be connected to a pressure source, within the housing a coupling hole having a central axis and an inner diameter approximately corresponding to the outer diameter of the inflation valve to which the valve connector is to be connected, and a cylinder and means for conducting gaseous media between the cylinder and the pressure source, and which activating pin is arranged for engaging with a central spring-force operated core pin of the inflation valve, is arranged to be situated within the housing in continuation of the coupling hole coaxially with the central axis thereof and comprises a piston part with a piston, which piston is to be positioned in the cylinder movably between a first piston position and a second piston position.

BACKGROUND OF THE INVENTION

It is well-known from PCT/DK96/00055, now U.S. patent application Ser. No. 08/837,505, herein incorporated by reference, that an activating pin located within the coupling house can be designed as a piston equipped with a suitable seal and a piston rod that is slidable in the cylinder-shaped coupling house. The piston can be held in a longitudinal position against the cylinder valve without applying physical force so that the piston automatically slides, after the valve connector is placed on the inflation valve, by means of compressed air. This compressed air comes from the pressure source such that the piston, in the proximal position to the valve, (1) opens up the inner valve, (2) opens the air passage to the valve and, (3) tightens less than 100% against the cylinder wall while in the distal position from the valve.

FIG. 14 in PCT/DK96/00055 shows a valve (360) which must be closed against the piston control. The disadvantage is that the above-mentioned two seals must be operational at a certain section of the sliding. This requires very accurate calibration of the cylinder wall and the piston movement. Furthermore, the piston has a precisely defined opening zone and can thus only adjust itself to a minor extent to the tolerances of the pump valve in question.

FIGS. 8, 9, 10, 14, and 15 in PCT/DK96/00055 show various activating pins equipped with a center blind drilling or a center drilling, side drillings and a V-shaped milling at the bottom which is perpendicular to the center axial drilling of the piston. The effect of this is that more force than necessary has to be applied when pumping, especially at high air velocities.

FIG. 9 in PCT/DK96/00055 shows an activating pin which has a center drilling, side drillings and a V-shaped milling at the bottom. When the coupling is connected to e.g. a high pressure pump with a built-in check valve, the spring keeps the valve of the activating pin in a closed position after uncoupling of a Schrader valve. If a tire with a Sclaverand valve has to be pumped immediately afterwards, one has to apply a large force to slide the activating pin which opens the inner valve of the Sclaverand valve. Air will escape and consequently the pumping time will be substantially longer if the tire has already been partly pumped. This last-mentioned problem also exists in the embodiments shown in FIGS. 10 and 15 in PCT/DK96/00055.

THE OBJECT OF THE INVENTION

The purpose of the present invention is to produce a reliable activating pin which is: (1) inexpensive, (2) has low aerodynamic drag making it comfortable to use for pumping purposes, and (3) provides the shortest possible pumping time.

These tasks are solved by the invention mentioned in claim 1 where the activating pin further comprises a valve part, the piston part comprises within it a channel, the cross-section of said channel is, at at least one part of said piston part, consisting of sectors, wherein in each sector the distance between the center point of the channel cross-section and the outermost limiting surface of the channel is larger than the corresponding distance measured along the line separating the sector from an adjacent sector, and said valve part is positioned movably with respect to said piston part between a first valve position and a second valve position for enabling the conduction of gaseous and/or liquid media through said channel when said valve part is in said first valve position, and inhibiting the conduction of gaseous and/or liquid media through said channel when said valve part is in said second valve position.

The channels are positioned in a mainly longitudinal direction in relation to the center axis of the housing, and can be defined by at least one cross section which approximately can be defined by at least one curve. The curve is closed and can be defined by two unique modular parametrisation Fourier Series expansions, one for each co-ordinate function:

$$f(x) = \frac{c_0}{2} + \sum_{p=1}^{\infty} c_p \cos(px) + \sum_{p=1}^{\infty} d_p \sin(px)$$

where $$c_p = \frac{2}{\pi} \int_0^{\pi} f(x) \cos(px) dx$$

$$d_p = \frac{2}{\pi} \int_0^{\pi} f(x) \sin(px) dx$$

$$0 \le x \le 2\pi, x \in R$$

$$p \ge 0, p \in N$$

$c_p$=cos-weighted average values of f(x),
$d_p$=sin-weighted average values of f(x),
p=representing the order of trigonometrical fineness thereby resulting in a large flow cross section area. All kinds of closed curves can be described with this formula, e.g. a C-curve. One characteristic of these curves is that when a line is drawn from the mathematical pole which lies in the section plane it will intersect the curve at least one time. A regular curve bounding a region which is symmetric with reference to at least one line which lies in the section plane through the mathematical pole can be defined by a single Fourier Series expansion:

$$f(x) = \frac{c_0}{2} + \sum_{p=1}^{\infty} c_p \cos(px)$$

where

-continued $$c_p = \frac{2}{\pi}\int_0^\pi f(x)\cos(px)dx$$

$$0 \le x \le 2\pi, x \in R$$

$$p \ge 0, p \in N$$

$c_p$=weighted average values of f(x),
p=representing the order of trigonometrical fineness.

When a line is drawn from the mathematical pole it will always intersect the curve only one time. In order to minimize the aerodynamic friction the channels are positioned mainly parallel to the centerline of the activating pin.

When the curves are approximately defined by the following formula, the cross section area of the channels is optimized by a certain given cross section: e.g. a section which combines approximately laminar flow and which can guide a central piston valve rod. It is then also possible to obtain a contact area for a Schrader valve core. This means that a bridge is unnecessary. In the following description, curves defined by the formula have been given the name "flower-shaped". The formula is:

$$f(x) = \frac{c_0}{2} + \sum_{p=1}^\infty c_p \cos(3px)$$

where $$f(x) = r_0 + a \cdot {}^{2m}\!\!\sqrt{\sin^2\!\left(\frac{n}{2}\right)\!x}$$

$$c_p = \frac{6}{\pi}\int_0^\pi f(x)\cos(3px)dx$$

$$0 \le x \le 2\pi, x \in R$$

$$p \ge 0, p \in N$$

$c_p$=weighted average values of f(x),
p=representing the order of trigonometrical fineness
and where this cross-section in polar co-ordinates approximately is represented by the following formula:

$$r = r_0 + a \cdot {}^m\!\!\sqrt{\left|\sin\!\left(\frac{n}{2}\varphi\right)\right|}$$

where $r_0 \ge 0$, $a \ge 0$, $m \ge 0, m \in R$, $n \ge 0, n \in R$, $0 \le \varphi \le 2\pi$, and where
r=the limit of the "petals" in the circular cross section of the activating pin.
$r_0$=the radius of the circular cross section around the axis of the activating pin,
a=the scale factor for the length of the "petals",
$r_{max}$=the parameter for definition of the "petal" width,
n=the parameter for definition of the number of "petals",
φ=the angle which bounds the curve.

Pursuant to the invention, an activating pin ensures a large flow cross section which, by means of radial fins, also produces an approximately laminar flow which contributes to a reduced pressure drop during the flow. Similarly, the radial fins can control any centrally positioned valve without blocking the air passage.

In a first embodiment of the invention, the piston rod is equipped with two blind drillings parallel to the center axis that reaches the activating pin at both ends of the activating pin. The piston rod is also equipped with a concentric valve made of an elastic material, e.g. a valve rubber used on a Dunlop-Woods valve and squeezed onto the piston rod between e.g. its upper and lower part covering the radial drilling proximal to the pressure source. The radial drilling has an azimuth angle α larger than or equal to 90° to the center axis of the piston, seen in the flow direction of the air at flow from the side of the pressure source. Furthermore, the distal radial drilling has an azimuth angle β larger than or equal to 90° to the distal center drilling of the piston, seen in the flow direction of the air at flow from the side of the pressure source. To ensure an interaction between the piston and the inner valve in a Schrader valve, the radius $r_0$ in the distal blind drilling is smaller than the radius $r_0$ of the proximal part of the center drilling. Due to evident arrangements in dimensioning the by-pass, the piston control is proximally equipped with longitudinal air ducts and/or having a bigger diameter. Moreover, the side of the piston is chamfered. If connected to e.g. a pump with a built-in check-valve, the connector needs to have an airing valve or a similar solution for providing the shortest pumping time. This results in a reliable activating pin because the pin valve works independently of the piston control fit and tolerances of the pump valves in question. It also results in a pin with low aerodynamic drag, which is comfortable for pumping purposes and which is inexpensive to produce.

A second embodiment is an improvement of the first embodiment where the coupling is connected to e.g. a high-pressure pump with a built-in non-return valve. A spring force being produced by means of the combination of compressed air and the valve lever passing through the piston in a eccentric position ensures the lowest possible pumping time. The effect of the eccentric valve lever is that the air pressure in the space between the non-return valve of the pump and the activating pin becomes equal to the pressure of the surroundings as the valve lever opens the above-mentioned space if a Schrader valve is disconnected. It is thus always possible to couple a Sclaverand valve without air escaping from the tire. Alternatively, an airing valve which is constantly shut could be established in the above-mentioned space when the connector is coupled to the valves or when the activating pin touches the core of the Schrader valve. This can take place if, for example, the airing is shaped as a narrow channel at the pressurized side of the activating pin relative to the distal end of it. In a special embodiment, it is proposed that the eccentric valve lever is integrated in the piston valve which makes the activating pin inexpensive to produce. The activating pin works independently of the piston control fit.

A third embodiment comprises a similar combination to the one described in the second embodiment, except here the activating pin has a center drilling. It is appropriate if the center drilling at each end expands gradually by a circular cross section and has an angle γ or δ, respectively, with the center axis of the activating pin and each angle is larger than 0° and smaller than 20° (usually in the interval between 6° and 12°). In an appropriate embodiment, the top of the piston of the activating pin forms a valve seat for the valve (304). This results in a large opening area created by a small movement of the eccentric valve lever. In a special embodiment it is suggested that the eccentric valve pin is loose in the piston and a stop device is used to stop its movement. The stop device is an integrated part of the piston valve and is resilient in relation to it. The piston valve rod has e.g. a "flower-shaped" cross section and the piston rod e.g. a circular cross section, resulting in channels (321). The activating pin is very reliable and inexpensive to produce. The air flow in the valve connector is approximately laminar which ensures low aerodynamic drag so that it is comfortable when pumping even with (low pressure) pumps without an integrated non-return valve. The improvement over the activating pin shown in FIG. 9 in PCT/DK96/00055 is considerable regarding reduction in pumping force and pumping time and is as good as e.g. the valve connector of FIGS. 5A, 5B, 6 and 7.

A fourth embodiment is an alternative to the third embodiment. As the piston valve is rotating at an angle $\ominus$ in relation to the top of the piston, if activated by the eccentric valve pin, the rotation is limited with a stop device. The cross section of the piston rod can have two main forms, according the specific formula each being "flower-shaped" with different parameters, both resulting in an approximately laminar flow. In a special embodiment, the radius $r_0$ is smaller than the radius of the core of a Schrader valve while the air is flowing through the distals of the "flower shaped" cross section. The eccentric valve lever is similar to the loose type of FIG. 5D, with the difference being that the top is rounded off. The characteristics of this model are almost in accordance with those of the third embodiment.

In a fifth embodiment of the invention, the activating pin is designed as a piston with a piston rod that is slidable in the cylinder-shaped coupling house. The activating pin has a center drilling with an axially slidable valve in the center drilling that is kept closed by a spring where the center drilling of the activating pin has e.g. a "flower-shaped" cross section (D—D, FIG. 8B) and the piston valve rod has a circular one resulting in a reliable control and efficient air passage. The center drilling at each end expands gradually by a circular cross section. The walls of the gradual expansions form an angle $\rho$ or $\phi$, respectively, between 0° and 20° (usually in the interval between 6° and 12°). The wall of the gradual expansion by the piston part of the center drilling forms a valve seat for the seal face of the valve. The seal face of the valve is pressed into the correct position by a spring, e.g. an elastic band. In a special embodiment, the sealing surface is a small area with an angle $\Psi$, in relation to the center axis, of approximately 90°–150° (incl.) as seen in the flow direction of the air at flow from the side of the pressure source. This enables improved sealing. In a special embodiment, the valve is equipped with at least one fin or a similar device, which fits on the top of the edge of a Dunlop-Woods inner valve. It also fits either the top of the core of a Schrader valve, or the bridge of a Schrader valve without fitting the top of its core, as the activating pin does. In the last mentioned embodiment, the fin is equipped with a device perpendicular to the fin. Furthermore, the center drilling in the last-mentioned embodiment can also be designed in a way that provides a favorable flow in the area around the fin of the piston part. If e.g. combined with a pump with a built-in check-valve, the space between the connector and the check-valve need to have an airing or a similar solution. The activating pin is reliable, as it works independent of the piston rod fit and the tolerances of the pump valves. It is inexpensive to produce and it gives a low pump force, specifically with pumps without a check-valve. It works independent of piston control fit or pump valve tolerances.

In a sixth embodiment of the invention, the activating pin has a center axial drilling with a valve that is axially slidable in the drilling and is kept closed by means of a spring. The valve and the spring are made of one piece of deformable material. The axially slidable valve and the spring are partly formed by a conic section, with an apex angle ($2\epsilon$), and partly formed by an approximately cylindrical section with a mainly circular cross section. The spring is attached to the piston part of the activating pin by means of a securing device. This is expedient if the wall of the center drilling in the activating pin is gradually expanded and has an angle $\eta$ or $\upsilon$, respectively, in relation to the center axis of the activating pin. Each angle is larger than 0° and smaller than 20° (usually in the interval between 6° and 12°). The wall of the gradual expansion of the center drilling thus forms a valve seat for the seal face of the valve. The valve is pulled to the tightening position by the spring. In a special embodiment of the invention, the piston part is equipped with at least one fin or a similar device which fits on top of the core of a Schrader valve.

In another embodiment of the activating pin, the slidable valve has two cones resting upon each other. This turns the air flow around the valve and in the grooves into an approximately laminar flow. The piston valve rod and the piston rod define e.g. a cylindrical channel, while the rest of the piston rod has a "flower-shaped" cross section. The embodiment of the flow ensures low aerodynamic drag so that it is comfortable when pumping even with low pressure pumps without an integrated non-return valve. In addition, the invention is inexpensive. It works independently of piston control fit and pump valve tolerances. In a special embodiment, the sealing surface of the cones is a small area with an angle, in relation to the center axis of approximately 90°–150° (incl.) with the center axis as seen in the flow direction of the air at flow from the side of the pressure source. This enables improved sealing. In the case of combining this embodiment with pumps with an built-in check-valve, the space between the connector and the check-valve needs to be equipped with airing or the like. Instead of air, (mixes of) gasses and/or liquids of any kind can activate and flow through and around the embodiments of the activating pin. The invention can be used in all types of valve connectors, where at least a Schrader valve or any valve with a spring operated core can be coupled, irrespective of the method of coupling or the amount of coupling holes in the connector. Further, the invention can be coupled to any pressure source irrespective of whether or not there is a securing means in the valve connector. Any possible combination of the embodiments shown in the specification fall into the scope of the present invention. The various embodiments described above are provided by way of illustration and should not be constructed to limit the invention. Those skilled in the art will readily recognize various modifications and changes which may be made to the present invention without strictly following the exemplary embodiments and applications illustrated and described herein, and without departing from the true spirit and scope of the present invention.

DESCRIPTION OF THE DRAWINGS

In the following, the invention is described in detail by means of the preferred embodiments of which the main construction elements are shown on the drawings. The following is shown on the drawing:

FIG. 3A shows an enlargement of a further development of the second embodiment of the activating pin where the valve in the activating pin is activated by the eccentric valve lever.

FIG. 3B shows the activating pin according to FIG. 3A where the valve in the activating pin is kept closed by air pressure.

FIG. 3C shows section A—A of FIG. 3A.

FIG. 3D shows the top of the piston and valve of the activating pin according to FIG. 3A (view X).

DESCRIPTION OF PREFERRED EMBODIMENTS

Figure 1A:
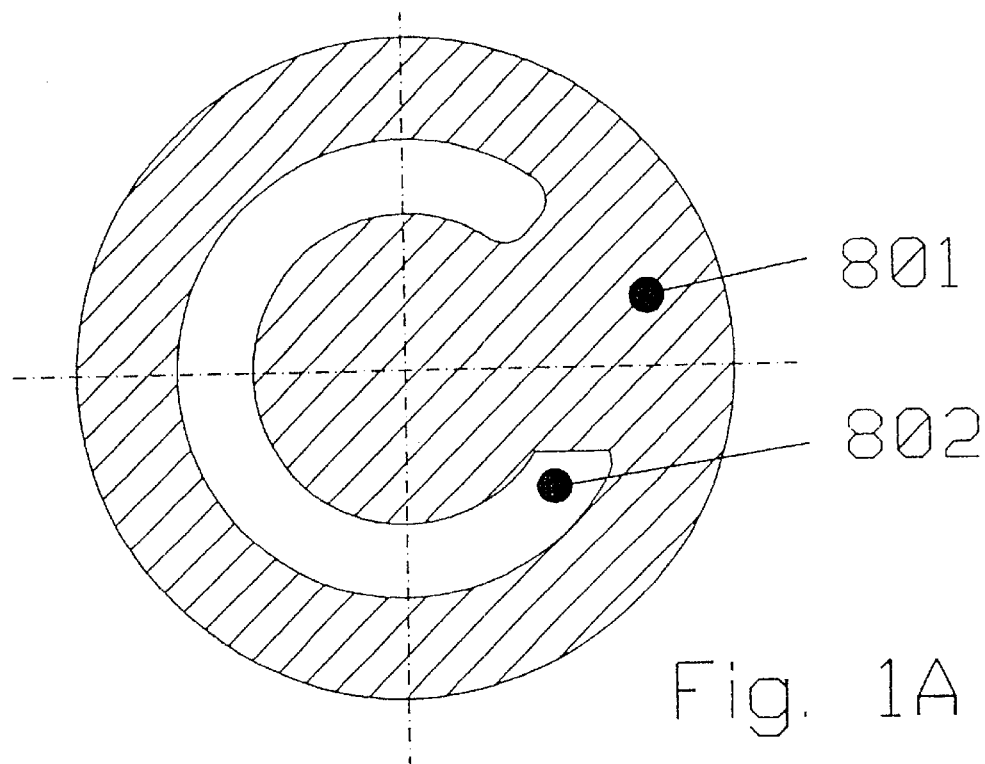
FIG. 1A shows an illustration of a channel's curve which is defined by two unique modular parametrisation Fourier Series expansions.

FIG. 1A shows a cross section of e.g. a piston rod 801 with a channel 802. Its curve is defined by two unique modular parametrisation Fourier Series expansion.

Figure 1B:
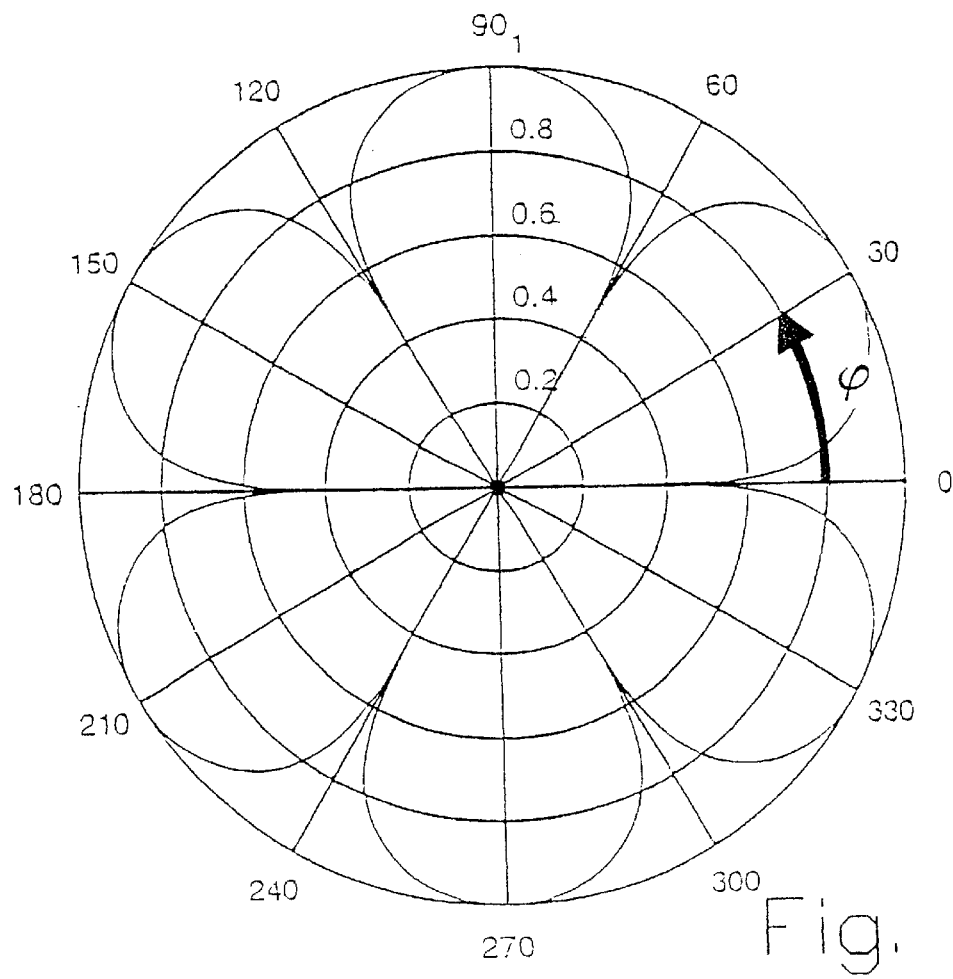
FIG. 1B shows an illustration of the mathematical model of the "flower-shaped" cross section.

FIG. 1B shows a mathematical model of the "flower-shaped" cross section that provides a suitable approximation. The general formula for this cross section is found above. In the model shown is:

$$r_0 \approx 0.4\ r_{max},\ m=4\ and\ n=6.$$

The change from a center drilling 303,410,533,653 to the circle section of expansions 312,313,411,412,538,539,658 can mathematically be expressed by $$r_0 \rightarrow r_{max}$$

under retention of the other parameters.

Figures 2, 2A, 2B:
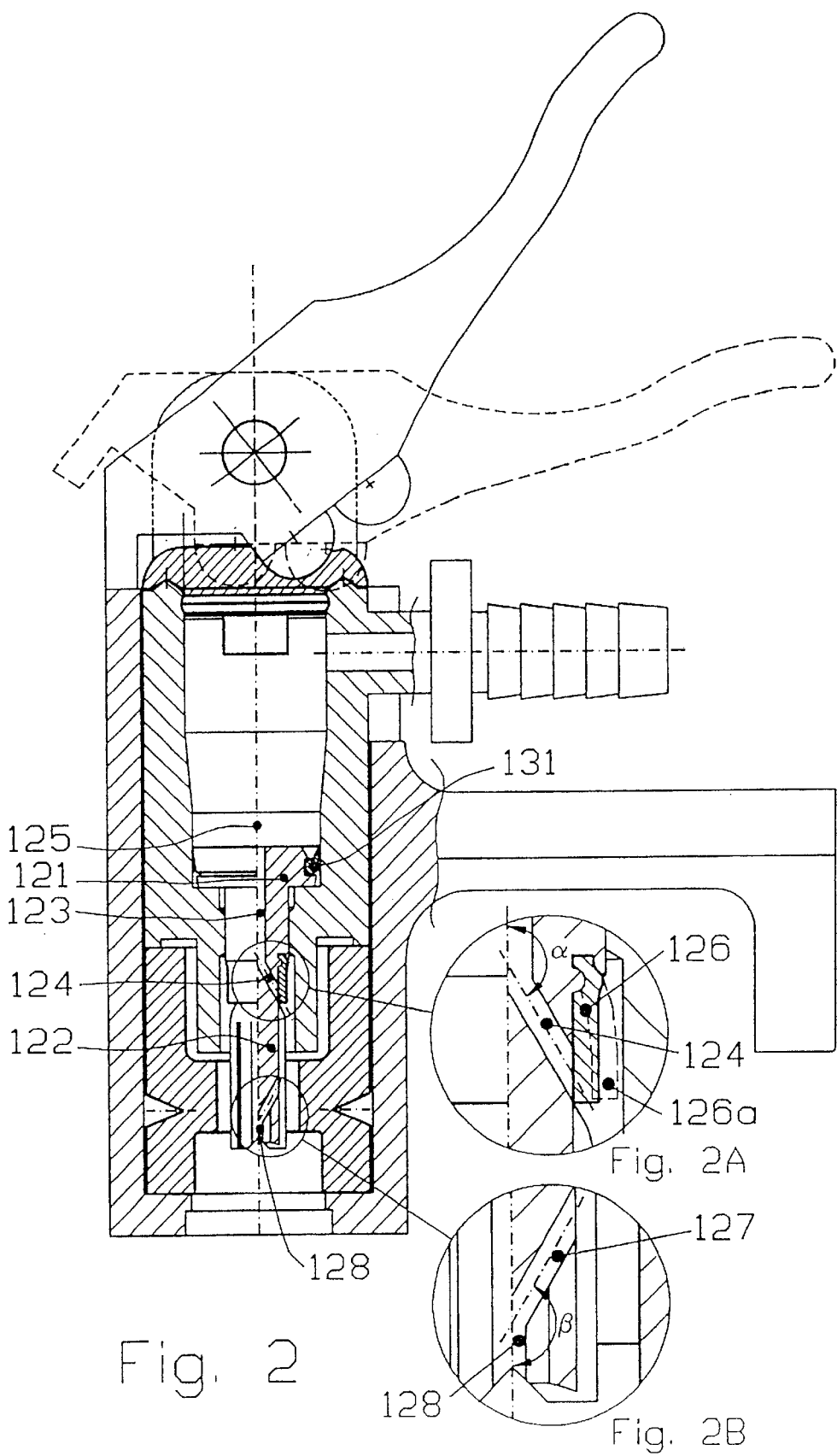
FIG. 2 shows a first embodiment of the activating pin shown in a distal position relative to the pressure source for a valve connector that can be squeezed onto valves.
FIG. 2A shows an enlargement of the piston valve according to FIG. 2. The broken line drawing shows the valve when it is open.
FIG. 2B shows the embodiment of FIG. 2 where the side drilling is positioned distally in the piston rod together with a center blind drilling.

FIG. 2 shows the first embodiment with the piston 121 in its distal position relative to the pressure source for a valve connector that is squeezed onto valves. The piston 121 has a piston rod 122 and is equipped with a center blind drilling 123 which branches into at least one radial drilling 124. Both blind drillings 123,128 have e.g. a "flower-shaped" cross section, of which the radius $r_0$ of blind drilling 123 is larger than radius $r_0$ of blind drilling 128. The proximal part of drilling 1223 and the distal part of drilling 128 can be provided with gradual expansions (not shown), seen from the pressure source. Also shown is the piston ring 131.

FIG. 2A shows the radial drilling 124 which has an azimuth angle α to the center axis 125 of the piston 121. The angle α is shown larger than 90°. The radial drilling 124 leads to the underside of the valve 126. The valve 126 is shown in its open position by means of a broken line 126a. The valve 126 is fastened by being squeezed between e.g. the upper and lower part (not shown) of the piston rod.

FIG. 2B shows the radial drilling 127 which is open at an angle β to the blind drilling 128. The angle β is shown larger than 90°. The radial drilling 127 leads to e.g. a center blind drilling 128 at a distal position on the piston rod 122.

FIG. 3A shows a further development of the activating pin shown in FIG. 2. The axially movable piston valve 225 is shown in an activated position by operation of the eccentric valve lever 226 which is integrated in the piston valve 225. The piston valve rod 227 has a sealing surface 228 which is positioned at the lid. This ensures that the piston valve 225 always opens up to make air flow possible, e.g. from the space between the non-return valve of a pump and the activating pin to the surroundings, when a Schrader valve is uncoupled. Tile piston rod 223 has a sealing 229 with a scaling surface 230. The piston valve 225 has a sealing 238 with sealing surface 239 and the top of the piston 222 has a sealing surface 240. The radius $r_0$ of drilling 248 is smaller than radius $r_0$ of drilling 224. The air flows through the center drilling 224, which has a "flower-shaped" section, and around the piston rod 227 which has a circular cross section resulting in channels 234 (section A—A) which form the center drilling 224. A stop device 231 prevents the piston valve from being pulled out of the activating pin as it strokes against the piston rod 223. A radial drilling 247 is positioned distally. The center axis 237 of the activating pin is also shown. The piston valve can have a gradual expansion (not shown) proximal to the pressure source.

FIG. 3B shows the activating pin according to FIG. 3A where the piston valve 225 is kept shut by air pressure. The valve function is fulfilled by the sealing 236 in full accordance with FIG. 2. The stop device 231 has a stop surface 232 and the piston rod 223 has a stop surface 233.

FIG. 3C shows section A—A of the piston valve 223 which has a "flower-shaped" section, and the piston valve rod 227 which has a circular cross section resulting in air channel 234 in order to enable a suitable flow through the section with reliable guidance of the piston valve rod 227.

FIG. 3D shows view X of the top of the activating pin where the piston valve rod 227 is hung in the shackle 235. The figure also shows the eccentric valve pin 226 which is integrated into the piston valve 225 and which is a section of a cylinder surface. In an appropriate embodiment not shown the valve pin is made by means of at least two legs that can be arranged rotationally symmetric around the center axis 237 of the activating pin. The embodiments described in FIG. 3D are, of course, applicable in connection with the other embodiments. Channel 242 is located between the shackle 235, the piston valve 225.

Figure 4:
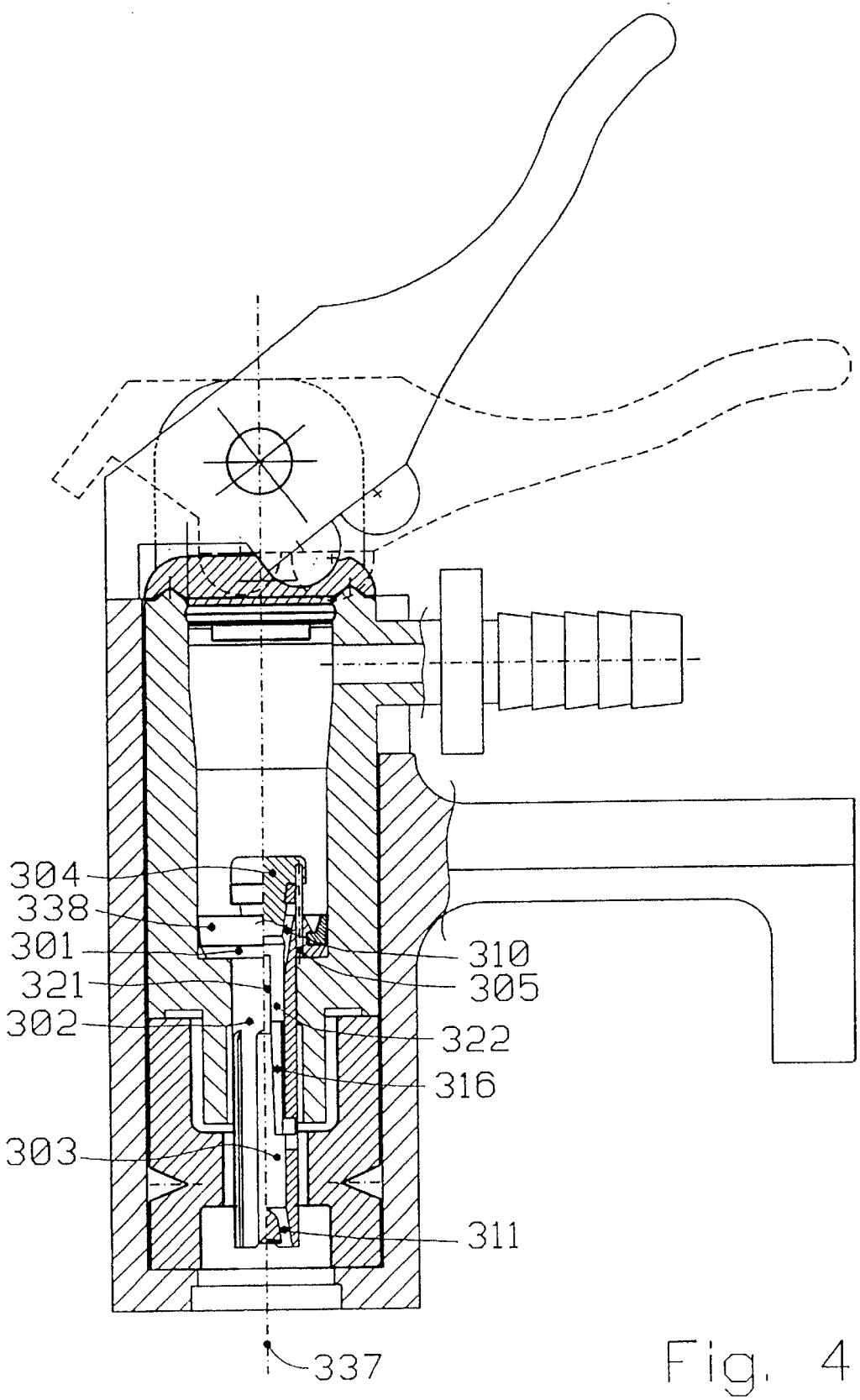
FIG. 4 shows a third embodiment of the activating pin in a distal position relative to the pressure source for a valve connector that can be squeezed onto valves.

FIG. 4 shows the third embodiment of the activating pin with the piston 301 in its distal position relative to the pressure source in a coupling house of a valve connector that can be squeezed onto tire valves. The piston 301 has a piston rod 302 and a center drilling 303. The activating pin has a piston valve 304 and an eccentric valve pin 305. Also shown are the center axis 337 and piston ring 338.

Figure 5:
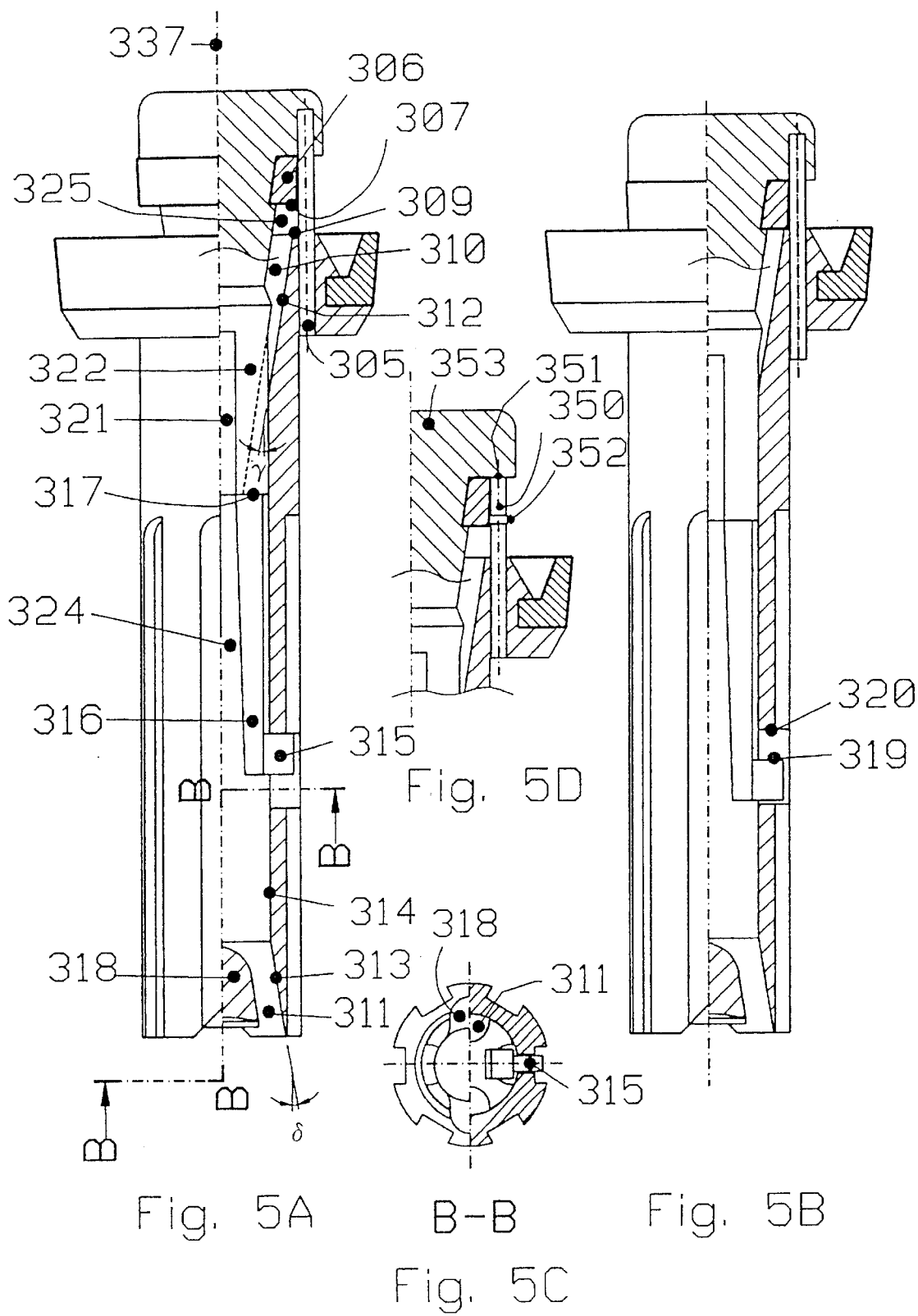
FIG. 5A shows an enlargement of the activating pin according to FIG. 4. The valve of the activating pin is activated by the eccentric valve lever.
FIG 5B shows the activating pin according to FIG. 5A where the valve is shut by gas and/or liquidmix pressure.
FIG. 5C shows section B—B of FIG. 5A (the piston is not shown).
FIG. 5D shows an eccentric a valve pin that is freely movable in the piston of the activating pin.

FIG. 5A shows an enlargement of the activating pin of FIG. 4. The axially movable piston valve 304 is in activated position by the eccentric valve lever 305 and has a sealing 306 with a sealing surface 307. The piston 301 has a sealing surface 309. The air flows through the proximally gradual expansion 310 of the center drilling 303 which e.g has a "flower-shaped" section to the distally gradual expansion 311. The wall 312,313 forms an angle γ or δ, respectively, with the center axis 337 of the center drilling 303. These angles are each larger than 0° and smaller than 20° and are usually in the interval between 6° and 12°. Both expansions 310,311 have an approximately circular section. Together, the "flower-shaped" cross-section of the piston valve rod 322 defines air channels 321 which e.g. four can be used in order to get an approximately laminar air flow. The stop 315 prevents the piston valve 304 from being pulled out of the activating pin in cases where the coupling is connected to a piston pump without a non-return valve. The stop 315 is resiliently mounted by means of the bar 316 in the bottom 317 of the piston valve rod 322. The cross section of this channel changes constantly over its length. The activating pin has distally at least one fin or a shackle 318 which is optimally shaped in terms of air flow. Channel 324 is defined by partly the inside and outside (see section B—B) of the piston rod 302, and partly by bar 316. Channel 325 is defined by piston rod 304, sealing 306 and the eccentric valve pin 305.

FIG. 5B shows the activating pin according to FIG. 5A where the piston valve 304 is kept shut by air pressure. The stop device 315 has a stop surface 319 and the stop surface 320 is a part of the piston rod 302.

FIG. 5C shows a section B—B with the air channel 311 which has a suitable flow through the section area. Moreover, the stop device 315 and the fin 318 are shown.

FIG. 5D shows the activating pin in an activated position with an eccentric valve pin 350 which is freely movable in the piston 301 of the activating pin and on which the piston valve 353 presses at the top 351. The stop device 352 ensures that the valve pin does not fall through the piston 301. In an appropriate embodiment not shown, the valve pin has at least two legs which can be positioned rotationally and symmetrically around the center axis 337 of the activating pin. The valve pin can also be designed as the valve pin 226 shown in FIG. 3A. Embodiments described in FIG. 5D are, of course, also applicable in connection with the other embodiments.

Figure 6:
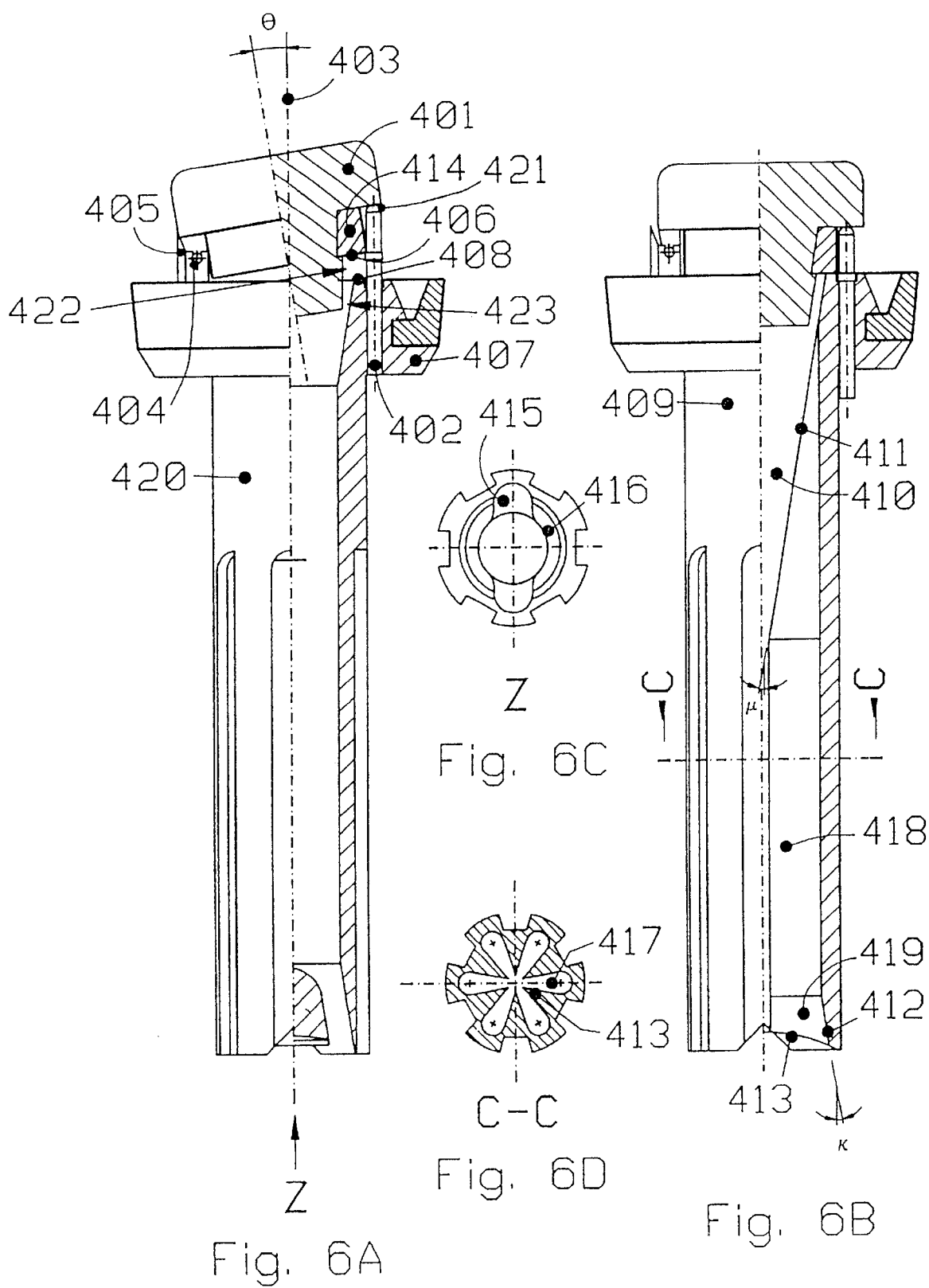
FIG. 6A shows the fourth embodiment of an activating pin similar to FIG. 5, with a rotatable piston valve which is activated by the eccentric valve pin.
FIG. 6B shows the activating pin according FIG. 6A, where the piston valve is closed by gas and/or liquidmix pressure.
FIG. 6C shows view Z of FIG. 6A.
FIG. 6D shows cross section C—C of FIG. 6B.

FIG. 6A shows a fourth embodiment of the activating pin, which is similar to the third embodiment, in a position where the piston valve 401 is opened by the activated eccentric valve pin 402. The piston valve 401 rotates over an angle ⊖ from the center axis 403 of the activating pin. The piston valve 401 rotates around an axis 404 which is perpendicular to the center axis 403. The rotation of the piston valve 401 is limited by the stop device 405. The piston valve 401 has a sealing 414 with a sealing surface 406, while the piston 407 has a sealing surface 408. The rest of the activating pin is similar to FIG. 5A, except for the piston rod 420 and the eccentric valve pin 402 which has a rounded top 421 as shown in FIG. 5D. The channel 422 is defined by the piston valve 401, the sealing 414, the piston 407 and the eccentric valve pin 402. The channel 423 is defined by the piston 407 and the piston valve 401.

FIG. 6B shows the activating pin similar to FIG. 6A with the piston valve 401 shut. The piston rod 409 has different parameters for the "flower-shaped" cross section of the center drilling 418. Also here are two gradual expansions 410,419 and walls 411,412, respectively, with characteristics according to those of FIG. 5A: angles $\mu$ and $\kappa$ in relation to the center axis 403. The contact area 413 (see also FIG. 6B) of the activating pin with a Schrader valve has a cone shape. No bridge is necessary, as $r_0$ is smaller than the diameter of the core of a Schrader valve.

FIG. 6C shows view Z of FIG. 6A with fin 415 and opening 416.

FIG. 6D shows cross section C—C of FIG. 6B with the "flower-shaped" cross section of the piston rod 409 defining air channel 417. Also shown is a contact area 413 for engaging with the core of a Schrader valve.

Figure 7:
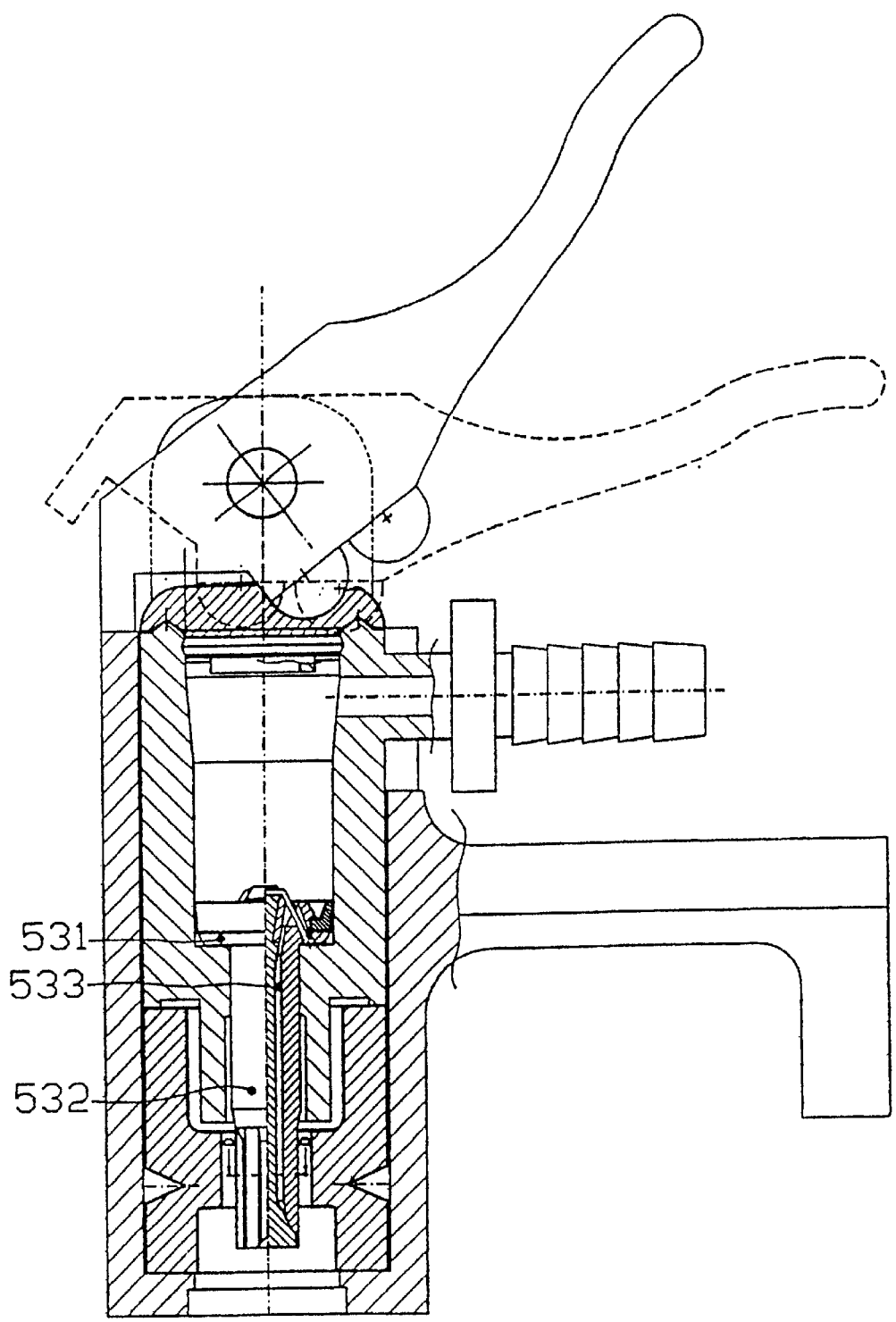
FIG. 7 shows a fifth embodiment of the invention in a distal position relative to the pressure source for a valve connector that can be squeezed onto valves.

FIG. 7 shows a fifth embodiment with the piston 531 in its distal position relative to the pressure source in the coupling house of a valve connector that can be squeezed onto valves. The piston 531 has a piston rod 532 and is equipped with a center drilling 533.

Figures 8A, 8B, 8C, 8D:
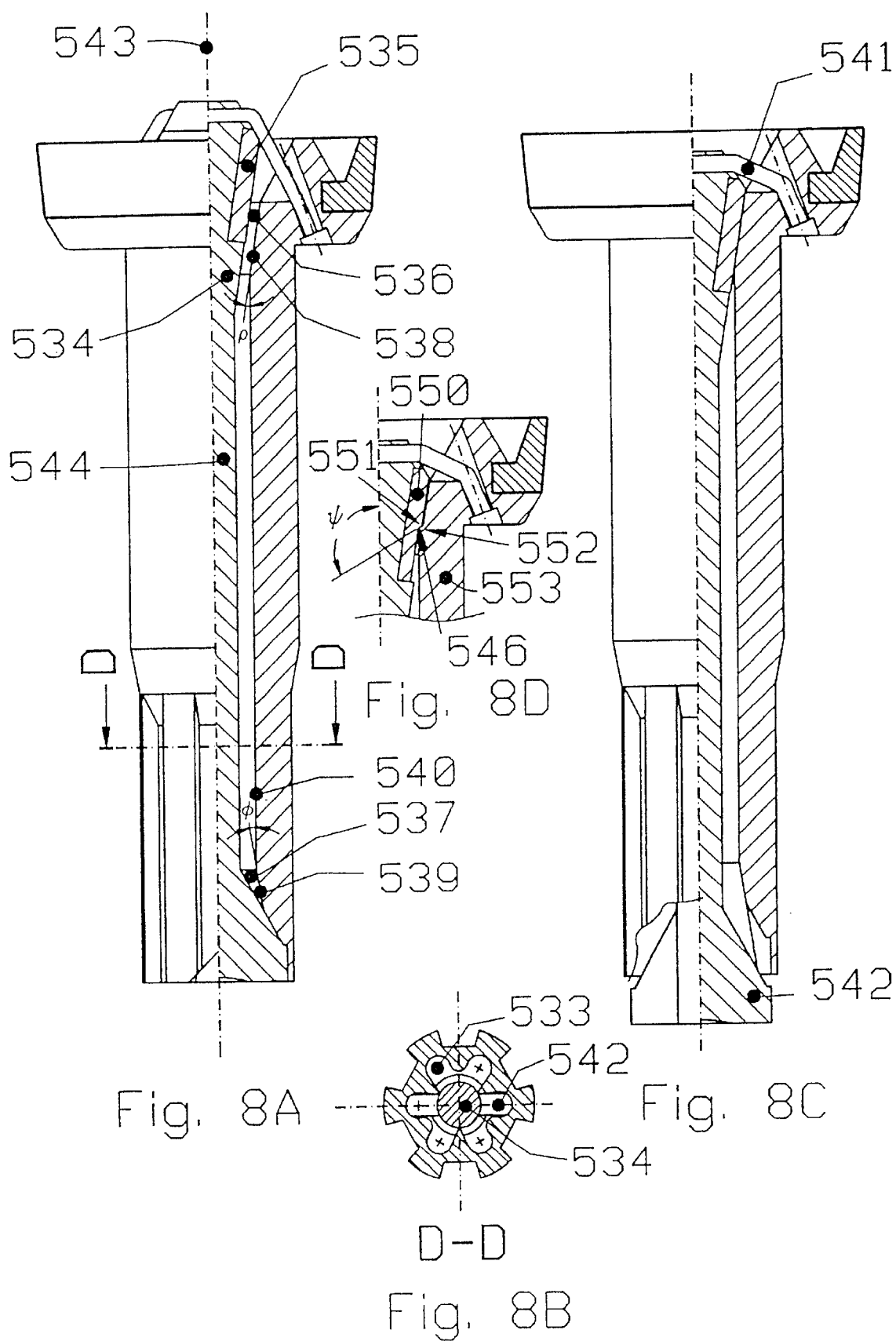
FIG. 8A shows an enlargement of the invention according to FIG. 7 where the valve in the activating pin is activated.
FIG. 8B shows section D—D of FIG. 8A.
FIG. 8C shows an enlargement of the invention according to FIG. 7 where the valve in the activating pin is kept closed by the spring.
FIG. 8D shows the embodiment according to FIG. 8C, with a different sealing surface.

FIG. 8A shows the activating pin in activated position where an axially slidable valve 534 has a seal face 535. The air flows through a proximal (to the pressure source) gradual expansion 536 of the center drilling 533 and through the latter to the distal gradual expansion 537. The wall 538,539 forms an angle ρ or φ, respectively, to the wall 540 of the center drilling 533. These are larger than 0° and smaller than 20° (usually in the interval between 6° and 12°). Both expansions 536,537 have an approximately circular cross section distally from the connection to the center drilling 533. Also shown are the center axis 543 and the piston valve rod 544.

FIG. 8B shows the section D—D from FIG. 8A where the channel 533 is defined by a "flower-shaped" cross section of the piston rod 532 and a circular cross section of the valve rod 544. Furthermore, a fin 542 is shown.

FIG. 8C shows the activating pin with a closed valve. The spring 541 secured in the piston 531 is an elastic band which presses the axially slidable valve 534 down so that the seal face 535 of the valve is pressed against the wall 538 of the expansion 536. The seal face 535 can have a similar sealing (not showed) with the wall 538 as showed in FIGS. 11A, 11B.

FIG. 8D shows an improved sealing surface arrangement sealing 550 with surface 551 and piston rod 553 with sealing surface 552. Angle ψ is between 90°–150° (incl.). The channel 546 is defined by the sealing surfaces 551 and 552, when these are separated from each other.

Figure 9:
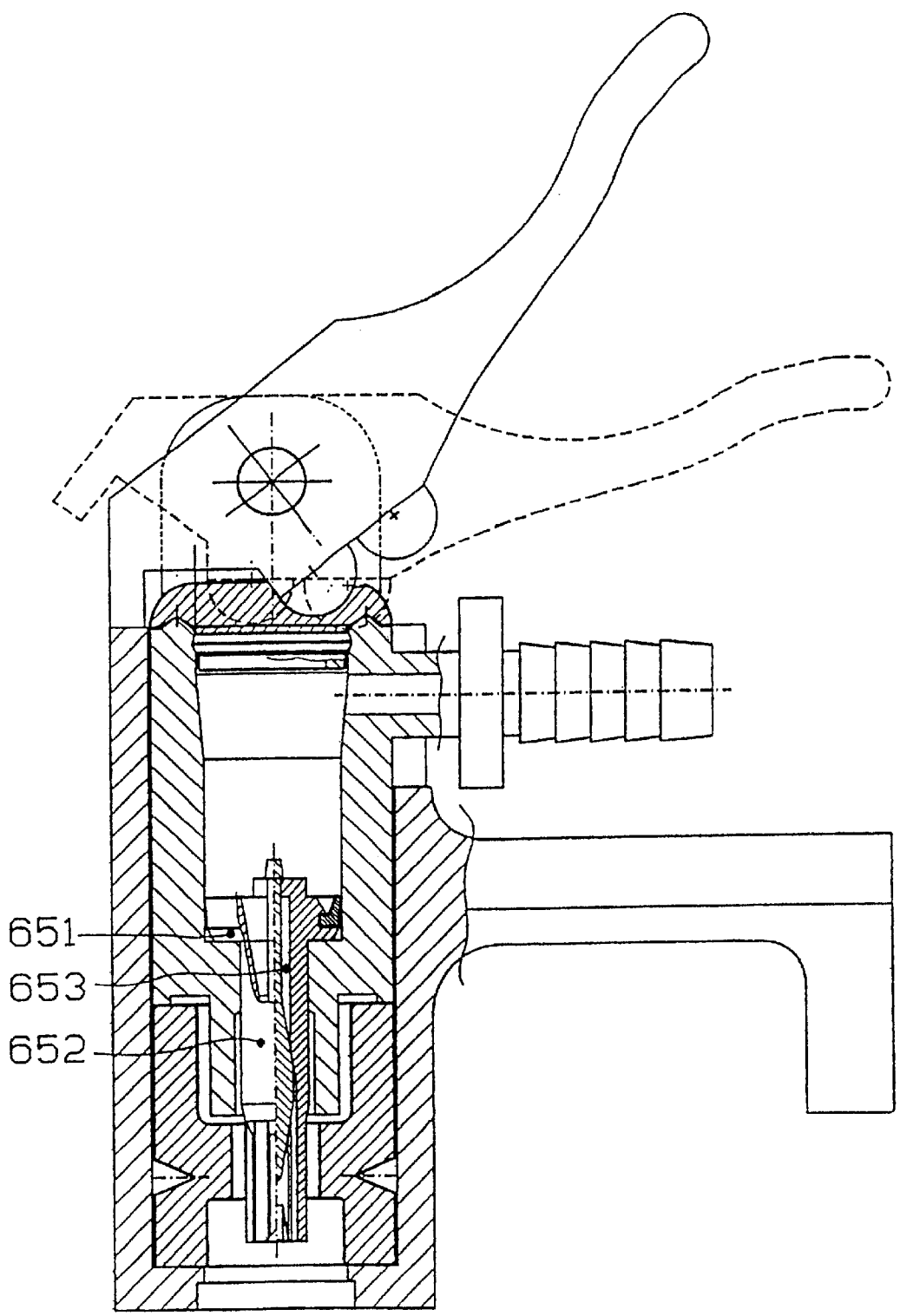
FIG. 9 shows the sixth embodiment of the invention in a distal position relative to the pressure source for a valve connector that can be squeezed onto valves.

FIG. 9 shows a sixth embodiment with the piston 651 in its distal position relative to the pressure source in a coupling house of a valve connector that can be squeezed onto valves. The piston 651 has a piston rod 652 and is equipped with a center drilling 653.

Figure 10A:
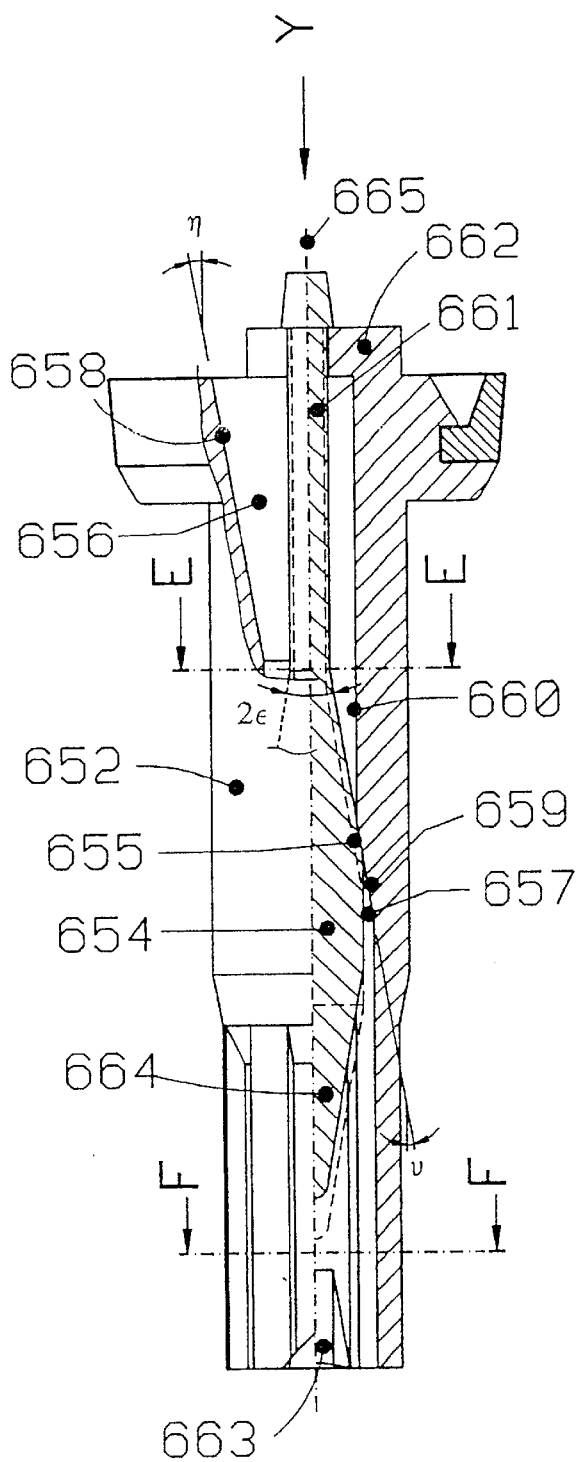
FIG. 10A shows an enlargement of the embodiment of FIG. 9 where the valve in the activating pin is in a closed position or activated position (broken lines).
Figure 10B:
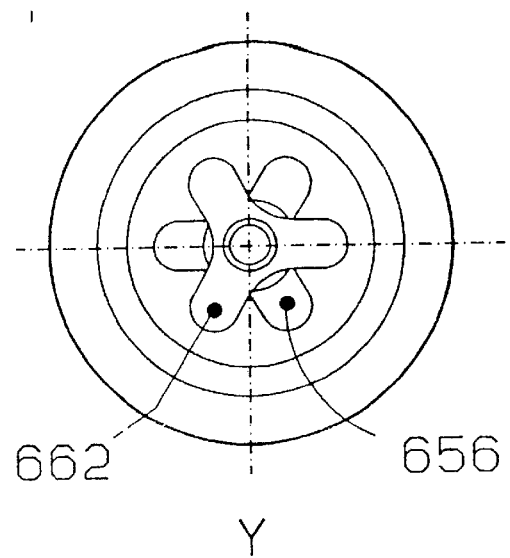
FIG. 10B shows the top of the activating pin according to FIG. 10A with spring suspension and intake (view Y).
Figure 10C:
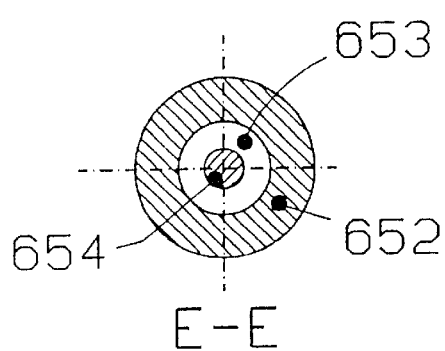
FIG. 10C shows a section after the line E—E in FIG. 10A.

FIG. 10A shows the activating pin in its closed position and its activated position (broken lines) where the axially slidable valve 654 has a seal face 655. The air flows through the expansion 656 of the center drilling 653 and through the latter to the distal gradual expansion 657 and the distal part of the piston rod with a "flower-shaped" cross section. The wall 658,659 forms an angle η or υ, respectively, to the wall 660 of the center drilling 653. These angles are each larger than 0° and smaller than 20° (usually in the interval between 6° and 12°). Both expansions 656,657 have an approximately circular cross section. The valve 654 has a spring part 661 secured in a brace 662. Distally, the activating pin has at least one fin or brace 663. Furthermore, a cone 664 is FIG. 10B shows the top (view γ) of the activating pin shown in FIG. 10A with the three expansions 656 and braces 662. The braces serve as a securing device for the valve spring and the expansions 656 ensure a suitable flow cross section FIG. 10C shows the section E—E in FIG. 10A resulting in a cylindrical air channel 653. A suitable flow cross section is also ensured here.

Figure 10D:
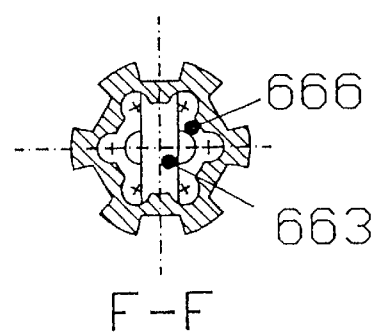
FIG. 10D shows a section after the line F—F in FIG. 10A.

FIG. 10D shows the section F—F in FIG. 10A. Internally, this section of the piston rod 652 is "flower-shaped" to ensure a suitable flow cross section. Furthermore, a fin designed as a brace 663 is shown. Also shown is the channel 666 between the brace 663 and the piston rod 652.

Figures 11A, 11B:
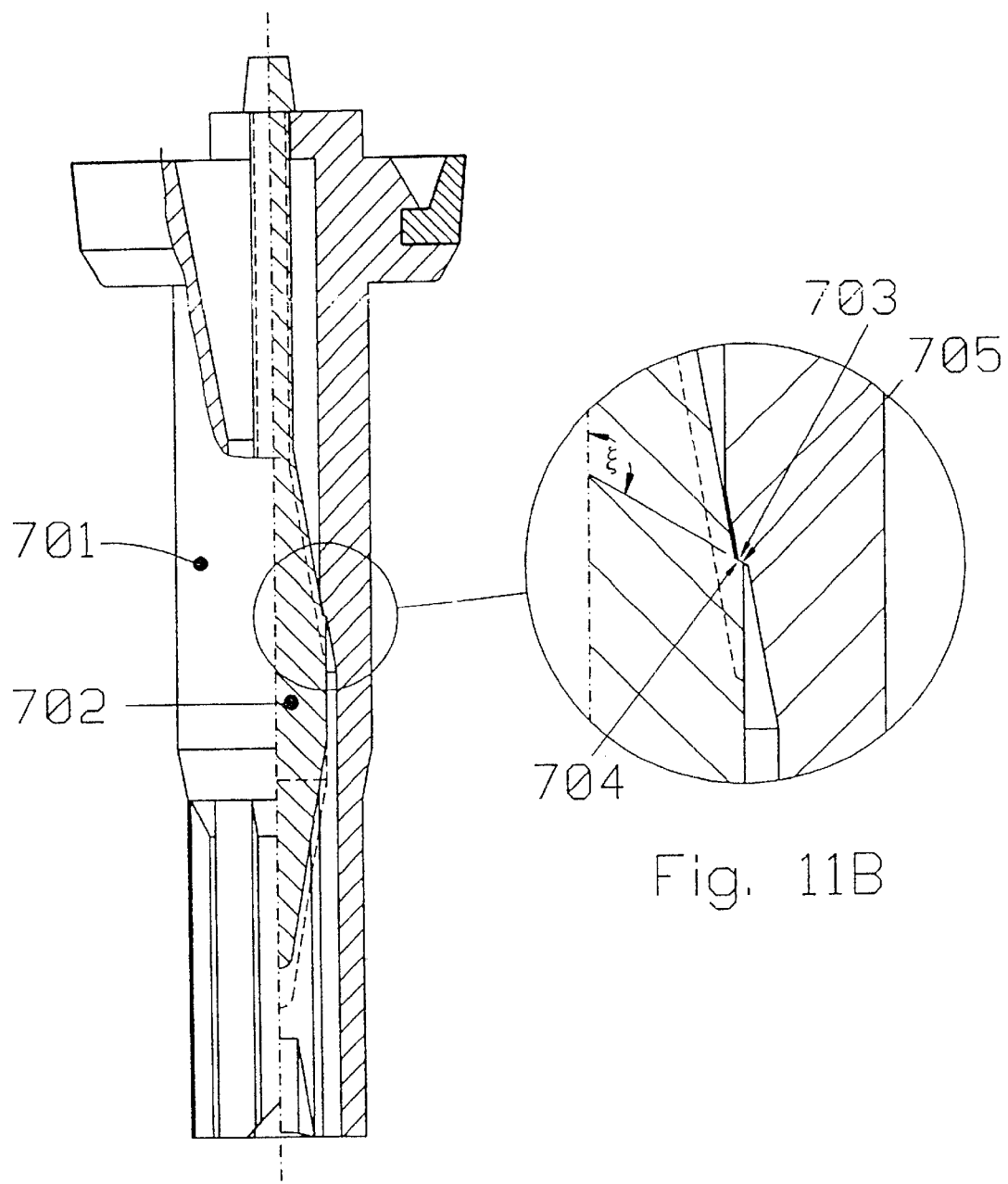
FIG. 11A shows the embodiment according to FIG. 11A, with a different sealing surface.
FIG. 11B shows an enlargement of the sealing surface of the embodiment of FIG. 11A.

FIG. 11A shows an activating pin similar to the one of FIG. 10, with the sealing surface 704 of the cone 702 and the corresponding surface 703 for the piston rod 701 having an angle ξ, equal to or larger than 90° and less than approximately 150° with the center axis 665 seen in the direction of the flow of the air at flow from the pressure source. Channel 705 is defined by the sealing surface 703 and 704, when these are separated from each other.

What is claimed is:

1. An activation pin for a valve connector for connecting to inflation valves, the connector comprising:
   a housing to be connected to a pressure source; the housing having a coupling hole having a central axis and an inner diameter approximately corresponding to the outer diameter of the inflation valve to which the valve connector is to be connected;
   a cylinder and means for conducting gaseous media between the cylinder and the pressure source;
   where the activation pin is positioned to engage a central spring-force operated core pin of the inflation valve; the pin is situated within the housing in continuation of the coupling hole coaxially with the central axis thereof;
   where the activation pin comprises:
      a piston part with a top and a piston, the piston positioned in the cylinder movable between a first piston position and a second piston position;
      a central channel,
      said piston part comprises a first end and a second end, wherein the piston is located at said first end and said channel has an opening at said first end;
      a valve part being movable in the central channel and drivable, by a difference in forces acting on surfaces of the valve part, between a first valve position and a second valve position, wherein said first valve position leaves said opening open, and said second valve position closes said opening; and,
      the top of the piston part forming a valve seat for a seal face of the valve part.

2. The activation pin of claim 1 where the channel further comprises a wall partly expandable towards the valve part, the angle of the expanding wall being 0–20° in relation to a central axis of the activation pin.

3. The activation pin of claim 1 wherein the pin further comprises means for driving said valve part into said first valve position when the piston is in the first piston position.

4. The activation pin of claim 1 wherein said valve part is movable with respect to a longitudinal direction of said piston part.

5. The activation pin of claim 1 wherein said valve part is arranged to rotate around a rotational axis mounted at said first end perpendicularly to a longitudinal axis of said piston part.

6. The activation pin of claim 4 wherein the pin further comprises stopping means to limit the movement of said valve part in the longitudinal direction of said piston part.

7. The activation pin of claim 5 wherein the pin further comprises stopping means to limit the rotation of said valve part in the first valve position.

8. The activation pin of claim 4 wherein:
   said piston part further comprises a first end and a second end, wherein the piston is located at said first end;
   said channel comprises a first channel portion and a second channel portion, both in the longitudinal direction of said piston part and connected to each other at a transition point;
   said valve part comprises a valve rod arranged to move within said first channel portion and having a free end; and,
   wherein said first valve position corresponds to said valve part being moved in the longitudinal direction of said piston part to a position where the free end of said valve rod leaves open the transition point between said first channel portion and said second channel portion, and said second valve position corresponds to said valve part being moved in the longitudinal direction of said piston part to a position where the free end of said valve rod closes the transition point between said first channel portion and said second channel portion.

9. The activation pin of claim 8 wherein the first channel portion and the second channel portion each have a distal end and transition point end; and at least one distal end of the first and second channel portions has a larger cross section area than the transition point end of the portion.

10. The activation pin of claim 4 wherein:
    said piston part comprises a first end and a second end, wherein the piston is located at said first end;
    said channel extends from said first end to said second end, the opening of said channel at said first end being circular;
    said valve part comprises a valve rod with a valve rod channel positioned in the longitudinal direction of said valve part, said valve rod arranged to move within said channel; and
    a cylindrical valve sealing with an axis at one end of said valve rod, the axis of said cylindrical valve sealing positioned in the longitudinal direction of said piston part, said channel and said valve rod, and the outer diameter of said valve sealing being larger than the diameter of the circular opening of said channel at said first end;

wherein said first valve position corresponds to said valve part being moved in the longitudinal direction of said piston part to a position where said valve sealing leaves open the circular opening of said channel at said first end, and said second valve position corresponds to said valve part being moved in the longitudinal direction of said piston part to a position where said valve part closes the circular opening of said channel at said first end.

11. The activation pin of claim 3 wherein said means for driving is an integrated part of the valve part.

12. A method of connecting a pressure source and a cylinder for conducting gaseous media between the source and the cylinder utilizing an inflation valve and a valve connector having an activation pin;

wherein the connector comprises a housing to be connected to the pressure source; the housing having a coupling hole having a central axis and an inner diameter approximately corresponding to the outer diameter of the inflation valve to which the valve connector is to be connected;

where the activation pin is positioned to engage a central spring-force operated core pin of the inflation valve; the pin is situated within the housing in continuation of the coupling hole coaxially with the central axis thereof;

where the activation pin comprises:
a piston part with a top and a piston, the piston positioned in the cylinder movable between a first piston position and a second piston position;
a central channel,
said piston part comprises a first end and a second end, wherein the piston is located at said first end and said channel has an opening at said first end;
a valve part being movable in the central channel and drivable, by a difference in forces acting on surfaces of the valve part, between a first valve position and a second valve position, wherein said first valve position leaves said opening open, and said second valve position closes said opening; and,
the top of the piston part forming a valve seat for a seal face of the valve part;
the steps of the method comprising:
connecting the valve connector to the inflation valve.

* * * * *